United States Patent Office 2,986,547
Patented May 30, 1961

2,986,547

METHOD OF COLORING VINYL AROMATIC POLYMERS

Albert W. Jefts, Glenville, and Herbert G. Rotherham, Cheshire, Conn., assignors to American Cyanamid Company, New York, N.Y., a corporation of Maine No Drawing. Filed July 10, 1958, Ser. No. 747,578

6 Claims. (Cl. 260—41)

The present invention relates to vinyl aromatic polymers, copolymers and blends thereof with elastomers. More particularly, this invention relates to a novel method of continuously coloring compositions of this type by a procedure involving removal of volatiles from liquid thermo-plastic composition-colorant blends and to the solid product obtained therefrom.

In the past, methods such as: (a) dry-blending the pigment or dye with plastic and thereafter extruding the mixture; or (b) mixing the plastic and colorant and fluxing on a two-roll mill at elevated temperatures, e.g., about 250° C., until the colorant is homogeneously distributed, or (c) dry-blending the colorant with plastic and injection molding, for example, have been commonly employed to introduce colorant into plastics of this type.

Among the notable deficiencies of these prior techniques is the non-uniform or heterogeneous distribution of color in the polymer composition even after extensive mixing procedures. Failure to completely integrate colorant has a significant effect on color strength and on subsequent discoloration. Another serious shortcoming of the prior art has been the severe loss in physical properties, in particular, lower impact strength, which may occur as a result of processing the plastic and colorant mixture in an effort to effect even color dispersion. In addition to extended milling or mixing times required in the prior art processes, skilled personnel are required to operate the mixing apparatus to produce a colored composition of useable quality as well as to derive substantial uniformity of color between subsequent batches. By the procedure of the present invention, colored compositions of exceptional quality having completely uniform distribution of color free from colorant agglomerates is obtained. The procedure is continuous and expeditious and provides excellent control over the hue, brilliance and saturation of the colored resinous compositions.

It is an object of the present invention to provide a continuous method for coloring vinyl aromatic polymers, copolymers thereof, and blends thereof with elastomers. It is a further object to provide a method for introducing colorant uniformly to a liquid polymeric composition at a controlled rate and to the removal of volatile content of the liquid colored composition to produce a solid thermo-plastic product. It is a further object of the invention to produce a polymeric composition of exceptional uniform color by the above method. Other objects and advantages of the invention will become apparent as the description of the invention proceeds. In the description which follows, the use of the word "polymer," unless expressly indicated otherwise, is contemplated as including within the term, homopolymers and copolymers, as well as blends of polymers.

The vinyl aromatic compounds (A) contemplated by the present invention are of the type represented by the general formula:

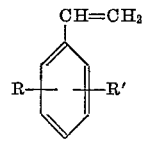

wherein R and R' are substituents selected from the group consisting of hydrogen and alkyl radicals of 1 to 4 carbon atoms. Examples of compounds contemplated by the above formula are styrene per se, methylstyrene, including ortho - methylstyrene, meta - methylstyrene and para-methylstyrene, dimethylstyrene, ethylvinyl benzene, diethylvinyl benzene, propyl styrene and the like or mixtures of any two or more of such compounds. Other polymerizable compounds of the type having the characteristic single $CH_2=C<$ group and which are substantially water-insoluble, such as acrylonitrile, methacrylonitrile, alpha - methylstyrene, alpha-chlorostyrene, methyl isopropenyl ketone, methyl acrylate, ethyl acrylate, n-propyl acrylate, methyl methacrylate, vinyl chloride, vinylidene chloride, isopropenyl propionate, dimethyl fumarate, dimethyl and diethyl fumerate, dibenzyl fumarate, methyl vinyl ketone, n-propyl vinyl ketone, methyl isopropenyl ketone, divinyl ketone and the like may be copolymerized with the vinyl aromatic compounds of the above formula. Such compounds are generally characterized as containing a polymerizable $CH_2=C<$ group. When such comonomers are employed with the monovinyl aromatic compounds, they are used in amounts preferably not exceeding about 35% of the vinyl aromatic. Illustrative examples of suitable combinations contemplated are copolymers of styrene-acrylonitrile, methylstyrene-acrylonitrile, styrene-methacrylonitrile, methylstyrene-methacrylonitrile, methylstyrene-alphamethylstyrene, styrene-alphamethylstyrene, methylstyrene-methyl isopropenyl ketone, styrene-methyl isopropenyl ketone, methylstyrene-alphamethylstyrene-acrylonitrile, dimethylstyrene-acrylonitrile and the like.

In addition, the composition to be colored according to the novel process of the invention includes resin-elastomer blends which may contain from about 5 to about 45 percent elastomer blended with the vinyl aromatic polymer or copolymer. The rubbery elastomer employed in preparing the blend may be any of the well-known rubbery compounds either natural or synthetic, many of which are available commercially either as solids or as emulsions or latices. In general these elastomers comprise polymers and copolymers derived from diolefin compounds such as butadiene-1,3; isoprene; 2,3-dimethylbutadiene-1,3; 1,4-dimethylbutadiene-1,3; piperylene; heptadiene-1,3; 2-methyl pentadiene-1,5; 2-methyl-3-butyl butadiene-1,3; 2,3-diethyl butadiene; and the like. The rubbery elastomeric component may consist entirely of a natural rubber or a synthetic rubbery diolefin, i.e., a homopolymer, although the diolefin rubbery polymer preferably contains a minor proportion, i.e., from about 5% to about 40% of an olefinic modifying compound, such as those of the general formula above, e.g., styrene, vinyl toluene, etc. or an acrylate or pyridine for example. The rubbery elastomers include such compounds as styrene-butadiene and butadiene-acrylonitrile rubbers, neoprene rubber, butyl rubber, silicone rubber, polyacrylate rubber, pyridine - butadiene rubbers and chlorosulfonated polyethylene, for example. The styrene-butadiene synethetic rubbers generally contain about 50–100% butadiene and about 0–50% styrene and the nitrile-butadiene rubbers about 15% to about 40% acrylonitrile, the remainder being butadiene. The compositions of these rubbers, styrene-butadiene and acrylonitrile-butadiene, referred to as SBR and NBR rubbers, respectively (ASTM designation: D 1418–56T, June 1956), however are not restricted to the above proportions. When blended with the resinous polymers as noted hereinabove, such elastomers are utilized in liquid form, i.e., either dissolved in a suitable solvent or as aqueous latex dispersions.

As colorants, any of the well-known pigments or dyes either organic or inorganic which are known and used for coloring, opacifying, delustering or otherwise modifying the color of the polymeric product may be employed. Dyes generally have the property of dissolving and consequently are employed when partial colors are desired. By and large, pigments which are insoluble and which produce translucent and opaque colors are employed. Many opaque colors are preferably produced, as is known in the art, by a combination of pigments and dyes wherein the pigments provide the opacifying effect and/or a component of the colorant, while a suitable dye may be used to add the proper color hue.

Inorganic pigments which may be utilized include: white opaque pigments such as lead, zinc, titanium, antimony or zirconium oxide, lead tetraphosphate; white extender pigments such as calcium carbonate, calcium sulfate, barium sulfate, crystalline silica, silicates of magnesium, aluminum, and the like; red and brown pigments such as those derived from iron oxides, e.g., copperas ($FeSO_4 \cdot 7H_2O$); red lead, cadmium sulfide, cadmium lithopones, cadmium sulfoselenides, cuprous oxide, mercuric sulfide, antimony vermilion ($Sb_2S_3$), raw and burnt umber; yellow and orange pigments such as the iron oxides (e.g., ochers and siennas from limonite ores), lead chromates, molybdenum orange, zinc yellows and cadmium yellows; green pigments such as chrome green (i.e., composites of chrome yellow and iron blue), chromium oxide green, hydrated chromium oxide, Paris green [$Cu(C_2H_3O_2 \cdot 3CuAsO_2)_2$], copper resinate, cobalt green and the like; blue pigments, e.g., iron blues, such as those referred to as Prussian, Chinese, Milori, steel, bronze, non-bronze, lacquer and toning blues, ultramarine blues, blue lead, sublimed blue lead, cobalt blue; black pigments such as carbon black, lampblack, vegetable blacks, animal blacks, graphite, natural black iron oxide and precipitated black iron oxide; aluminum pigment, which consists primarily of relatively pure aluminum, the particles of which carry a thin film of stearic acid and stearic acid lubricant; bronze powders which include any of the finely divided flakes of mixtures of aluminum, copper and its alloys, gold, silver, lead, nickel, tin, stainless steel, including such flakes or powders dyed with synthetic dyes; and luminous pigments such as zinc sulfide containing a small amount of copper as an activating agent. Organic pigments include nitro compounds such as those obtained by condensing 1 mole of formaldehyde with 2 moles of an arylamine; monoazo and diazo compounds, e.g., 2-naphthol derivatives, arylides of 3-hydroxy-2-naphthoic acid, arylides of acetoacetic acid, pyrazolone derivatives, anthraquinone vat dyes, indigoid derivatives; cationic derivatives, e.g., those known as brilliant green, methyl violet B, rhodamine B, and Auramine O; anionic derivatives, e.g., Azo Bordeaux B, Orange II, tartrozine O, anthrosine B, quinoline yellow, lithol red R, lake reds C and D, lithol rubine B, alkali blue; chelate derivatives such as pigment green B, naphthol green B, pigment scarlet 3B, copper phthalocyanine, alizarin and helio fast rubines 3BL, 4BL or 6BL, and the like. Examples of commercially available colorants which may be utilized with the vinyl aromatic polymers, copolymers and blends according to the method of the invention include those marketed under names such as Pigment Scarlet 20–9100, Bonadur Red 20–9155, Bonadur Red B 20–6450, Bonadur Red XY 20–6410, Clarion Red 20–7150, Red Lake C Toner ZMF 20–5652, Benzidine Orange Toner 45–2850, Benzidine Yellow Toner, 45–2650, Cyan Green Toner G 15–9012, Cyan Green G 15–9021, Cyan Blue Toner B 55–9010, Cyan Blue B 55–9081, Cyan Blue Toner GT 55–3300, Calcophyll Pink, Anthraquinone Violet NC base which are manufactured by the American Cyanamid Company; Zulu Green, Cadmium Primrose 1465, Cadmium Selenide Red, Nos. 1410, 759 J or 843 J, Cadmium Selenide No. 1470, Zulu Blue 573 J, and Cadmium Red 73 K manufactured by the Kentucky Color and Chemical Company for example. It is apparent that the foregoing are merely illustrative and that many additional colorants or mixtures thereof may be employed without in any way departing from the inventive method herein set forth.

In a general way, the novel process of the invention comprises introducing the colorant preferably dispersed in a liquid medium into the vinyl aromatic polymeric composition which is in solution. The colorant may be dispersed or dissolved in water, or in an organic medium including monomers of the type above referred, or the colorant may be dispersed or dissolved in the elastomer dispersion when a resin-rubber molding composition is produced. In preparing the solution of vinyl aromatic resinous polymer (A) to be used in practicing the invention, it is preferred that a solution contain not more than about 75% polymer dissolved in monomer and preferably at least 45% polymer. Amounts of polymer greater than 75% tend to result in difficulties in handling the material whereas monomer in excess of about 55% correspondingly minimize the economical advantage afforded by the technique by prolonging the processing time required to effect removal of the unreacted monomer from the solution of polymer in monomer. The polymer in monomer solution may be prepared by dissolving solid polymer in liquid monomer. However, it is apparent that such solutions may be derived directly from the incomplete polymerization of the monomer of compounds of the general formula, such as by the method describd in J. A. Melchore's pending application Serial No. 575,164. In this method, polymerization of the vinyl aromatic monomer is stopped prior to complete conversion of monomer to polymer. At this stage, a solution of polymer in solution with unreacted monomer is the reaction product. In accord with the present invention, it is preferred that not more than about 75% polymer be present in the solution of the resinous component and that this solution of the resinous composition be obtained through incomplete polymerization of the appropriate monomeric compound or mixture rather than by dissolving a substantially monomer-free solid polymer in a suitable solvent.

When an elastomer-resin blend is to be colored, the elastomer is employed in a dispersed form either in solution or as a colloidal emulsion, such as a SBR latex and the colorant may be added to the rubbery component or introduced as a separate stream together with rubber and resin and subjected to a devolatilizing step hereafter more fully described wherein the unreacted monomer and other volatiles are removed. It is apparent that the term "rubbery dispersion" includes a solution thereof, i.e., a dispersion of rubber in a solvent, as well as rubber in latex form. The solvent employed for each of the components, e.g., the hard resin and the rubbery elastomer may be any of the known solvents which are suitable therefor, such as the vinyl aromatic monomers of the above formula, toluene, xylene, etc. Preferably, the vinyl aromatic compound from which the major proportion of the hard resinous polymer component is derived is employed as the solvent for the elastomer when the elastomer is employed in solution form as distinguished from the elastomer as a latex. For example, if the resinous products are a blend of polymethylstyrene and styrene-butadiene type synthetic rubber, the solvent employed in making the solutions of polymethylstyrene and the styrene-butadiene rubber components to be blended is preferably methylstyrene monomer. The monomeric methylstyrene removed from the blending may thereafter be recycled for further use. In an alternative manner, the SBR elastomer may also be employed in latex form, the proportion of rubbery solid in the dispersion comprising between about 30% to 60% of the emulsion. In this alternate procedure, the separation of the recovered monomer from the monomer-water immiscible mixture (i.e., monomer derived from the resin solution and water from the elastomer latex) presents no difficulty.

According to the procedure of the invention generally, a stream of colorant and a stream or streams of polymeric material in solution are continuously fed in measured proportions, to give the desired composition, to a devolatilizer-extruder where the streams are mixed, compounded, devolatilized and extruded in a period not exceeding about 10 minutes. When devolatilizing, the mixture of polymer and colorant is worked in a chamber under heat and vacuum so that the new surfaces of the polymer mixture are continuously and rapidly exposed to vacuum to remove the monomeric solvent (and water where rubber in latex form is employed) before extruding the product. In its preferred aspects the invention contemplates continuously feeding a steram of colorant either dispersed or in solution in the desired proportion, with a stream of partially polymerized monovinyl aromatic compound obtained by incomplete polymerization of the monovinyl aromatic compound and subjecting the mixture to continuous compounding and devolatilization. The term devolatilization as herein employed refers to the step in which the nonpolymeric more volatile material is removed from the mixture of resin solution and rubbery dispersion. Apparatus which simultaneously devolatilizes and extrudes the material are available commercially and my comprise by way of example a chamber with one or more rotating spirally grooved shafts having a close tolerance with the chamber wall for compounding the material in its passage therethrough, and at least one vacuum chamber for removing the volatile components of the feed. The action of working the material under the close tolerance of the screw-like shafts not only intimately blends the mixture, but generates substantial heat which volatilizes the nonpolymer of the blend. Various modifications of various apparatus may be made within the teachings of the method herein presented.

Any of the suitable procedures for preparing the colorant in a fluid condition for introduction into the devolatilization step with the resinous material may be utilized. Thus, for example, a dye may be dissolved or dispersed in water or other relatively volatile organic medium such as monomer or the colorant in particular pigments may be placed in a ball, pebble or colloid mill together with a suitable liquid such as water or organic compound, e.g., monomer, and optionally a small quantity of the resinous material which is to be colored and dispersed in the mixture to enhance the thoroughness of dispersion in the subsequent devolatilize blending step. In such colorant preparation premixing procedure, the colorant and resin when used is preferably in finely divided or powdery form.

In the devolatilization step, the liquid colored composition is heated at temperatures of from about 110° C. to about 245° C. and maintained under vacuum at an absolute pressure of from about 5 to 200 mm. mercury. Preferably, the temperature is maintained at from about 160° C. to about 210° C. and the vacuum is preferably maintained at from about 5 to about 90 mm. mercury absolute pressure. As the streams are subjected to the devolatilizer-extruder, the increased temperature causes volatilization of the nonpolymer from the blended composition. At the same time, because conditions are maintained at subatmospheric pressures, the volatile material is withdrawn or devolatilized from the polymer-containing material. By this operation the purity of the polymer is carried to greater than 98%. It should be noted that the present process of blending in color while devolatilizing the mixture does not involve polymerization subsequent to introduction of the colorant, but rather concerns the removal of the volatile ingredients from the mixture employed in making the blend. In fact, the rapid passage of the blend through the devolatilizer-extruder is not conducive to any significant additional polymerization of polymerizable content present in the blend because of the rapidity of the passage of the composition through the zone.

It is then seen that the invention resides in a continuous process wherein a monovinyl aromatic polymeric composition is combined with colorant and the mixture is blended, compounded and extruded under the mechanical pressure and under vacuum. In the devolatilization, the nonpolymer contents of the mixture are thoroughly removed as the mixture is worked by the smearing heat-generating mechanical action under vacuum. By this technique the rate of diffusion is so improved that substantially 100% of the volatile undesirable nonpolymer material is removed from the the polymer thereby producing an excellent blend practically free of contaminants.

The total contact time of the material subjected to the devolatilization to produce a material of greater than 98%, and generally better than 99%, polymer is less than about 10 minutes and ordinarily from about 0.5 to about 5 minutes is adequate. The relatively brief blending time is of great advantage, particularly in view of the fact that it is conducted continuously. Moreover, the rapidity of the processing time has also been found to greatly minimize the loss of the desirable properties from the blend which commonly occurs when milling the mixtures by other methods. The accurate metering of the feed together with the short controllable blending time which is possible when employing the present method greatly facilitates the manufacture of an unusually uniform product.

The following examples are set forth as illustrative of the continuous process of our invention for making a resinous composition by simultaneously blending, extruding and devolatilizing a charge comprising a colorant and a hard resinous polymer or a colorant in combination with an elastomer and a hard resinous polymer. The results obtained in the examples set forth below are presented in Table I.

The specific enumeration of details should not be interpreted as a limitation except as expressed in the appended claims. All parts are parts by weight unless otherwise stated.

In preparing the vinyl aromatic polymers or copolymers to a partially but incompletely polymerized state, the following general procedure is employed.

*Preparation of the resinous polymer*

A vinyl aromatic monomer alone or with a comonomer is charged continuously to a stainless steel kettle equipped with agitator and heating means. Heat is applied until a temperature of approximately 80° C.–120° C. is obtained. The polymerizable material is reacted at a fairly constant temperature to approximately 20–40% polymer. This 20–40% polymer, 60–80% monomer solution is then fed continuously to a second reaction vessel wherein the material is maintained at a higher temperature and is further polymerized to approximately 55–75%.

The polymer solution derived as above described or by dissolving preformed polymer in monomer to approximately this proportion is then fed continuously to a devolatilization step. In the present description a counter rotating twin screw devolatilizer-extruder is employed. Simultaneously with introduction of this feed, a solution or dispersion of colorant in monomer or other liquid medium is also metered into the feed hopper of the devolatilizer-extruder. When as elastomer-resin blend is desired, the elastomer is also introduced at this point. In this extruder, the components are mixed and the volatile content including unreacted monomer is removed while the resinous polymer and colorant (and elastomer if present) are thoroughly compounded to form a homogeneous blend which is extruded through a multi-hole die and is cut into pellets of size suitable for use as a molding compound.

In order that the concept of the present invention may be more fully understood, the following examples are set forth in which all parts are parts by weight unless otherwise indicated. These examples are set forth primarily as illustrative and the specific enumeration of detail contained therein should not be interpreted as limitations except as specified in the appended claims.

EXAMPLE 1

A dispersion of titanium dioxide is made by ball-milling the following composition for a period of 20 minutes:

| | Percent |
|---|---|
| Titanium dioxide | 50 |
| Styrene-acrylonitrile copolymer | 2 |
| Styrene | 34 |
| Acrylonitrile | 14 |

This colorant dispersion is fed with a moving stream of fluid styrene-acrylonitrile copolymer (having a conversion of monomer to polymer of 63% and obtained through the incomplete copolymerization of these monomers) to the devolatilizer-extruder at a rate sufficient to provide a titanium dioxide content of 2 pounds of titanium dioxide per 100 pounds of resinous product. The product is a white opaque molding compound having excellent pigment dispersion. Articles molded therefrom have excellent uniformity and color stability.

EXAMPLE 2

A colorant dispersion comprising 27 percent ultramarine blue, 3 percent mineral violet, 12 percent methylstyrene-acrylonitrile copolymer (71:29 weight ratio) and 58 percent of methylstyrene monomer is prepared by intimately blending the mixture in a Baker-Perkins mixer for 30 minutes and subsequently diluting with a solution of methylstyrene monomer, acrylonitrile monomer and methylstyrene-acrylonitrile copolymer in a weight ratio of 90:5.5:4.5, respectively, until the concentration of colorant is 0.00225%. The diluted dispersion so prepared is continuously metered so as to provide a concentration of between 55 and 60 parts per million of colorant in the polymeric product. The colorant stream and a methylstyrene-acrylonitrile copolymer solution (62% polymer, 38% unconverted monomer) stream are mixed and subjected to devolatilization and extrusion at a rate of 200 parts per hour. A transparent blue tinted molding composition is obtained. Articles molded therefrom have an attractive crystal clear blue color.

EXAMPLE 3

1000 parts of methylstyrene is polymerized at 110° C. to a conversion of 65% and a stream thereof is fed continuously to the devolatilizer-extruder. At the same time, 164 parts of an aluminum powder [1]-methylstyrene monomer slurry of uniform consistency (containing 72 parts of aluminum powder and 92 parts of methylstyrene) is also introduced continuously to the devolatilizer-extruder. Approximately 442 parts of methylstyrene monomer is recovered in a two-stage devolatilization step and 722 parts of an aluminum polymethylstyrene mixture is extruded in the form of strands.

---
[1] The aluminum powder, available commercially as M.D. 5100 supplied by Metals Disintegrating Company, Elizabeth, New Jersey, is prepared into a 44% aluminum-56% methylstyrene paste by wetting the aluminum powder thoroughly with methylstyrene monomer and then milling, although other conventional methods may be used.

---

These strands are cooled and chopped to yield 722 parts of pelletized product consisting of 10 parts of aluminum powder to 90 parts of polymethylstyrene. The above procedure is repeated except that 493 pounds of the aluminum-methylstyrene slurry (217 pounds aluminum, 276 pounds methylstyrene) is used to produce 867 pounds of aluminum powder-polymethylstyrene mixture. The mixture is approximately 25% aluminum. The product obtained upon molding produces articles having a uniformly colored glossy appearance of silver gray metal.

EXAMPLE 4

A dispersion of phthalocyanine green pigment made by three-roll milling the following mixture

| | Percent |
|---|---|
| Phthalocyanine green | 25 |
| Polymethylstyrene | 19 |
| Methylstyrene | 56 | is metered into a moving stream of polymethylstyrene solution comprising a partially polymerized product (50% solids of polymethylstyrene in methylstyrene) at a rate sufficient to provide a phthalocyanine green concentration of 0.1 part per 100 parts of polymer. The mixture is blended under the mechanical pressure of a twin screw devolatilizing apparatus under vacuum (absolute pressure 70 mm. mercury) at 190° C. and extruded at a rate of 150 parts per hour. The product is pelletized by a rotating cutter upon extrusion. A uniformly colored green transparent molding composition which produces molded articles having good color permanence, is obtained.

EXAMPLE 5

Separate streams of the following components:
(a) polymethylstyrene solution (650 parts of polymethylstyrene-350 parts of methylstyrene)
(b) 435 parts of a 20% solution of commercial SBR rubber (styrene-butadiene, combined ratio of 23 parts styrene, 77 parts butadiene) dissolved in methylstyrene (87 parts SBR in 348 parts of methylstyrene, and
(c) 35 parts of a dispersion of titanium dioxide comprising 80% titanium dioxide, 5% polymethylstyrene and 15% methylstyrene are mixed and subjected to devolatilization and extrusion at 190° C. and under a vacuum of about 25 mm. In a period of 4½ hours, 740 parts of a white opaque product is obtained. The product is granulated, by shearing the strands of extrudate, to form a molding composition. The devolatilization-extrusion step is completed within 4½ minutes.

EXAMPLE 6

1000 parts of a comonomer mixture of methylstyrene and acrylonitrile in a weight ratio of 66:34 is polymerized in the presence of 0.1 part of tert. dodecyl mercaptan until a 60% conversion of monomers to combined copolymer is obtained. The copolymer solution is mixed with a stream comprising 25 parts of a liquid dispersion of hydrated chromium oxide (hydrated chromium oxide-75%, methylstyrene monomer-18% and methylstyrene-acrylonitrile [70:30] copolymer-7%). Following a devolatilization and extrusion of the blend at 20 mm. mercury, absolute pressure and 173–178° C., a step which consumes 5 minutes, a medium green translucent molding composition is obtained. The product is sheared into granules suitable for molding. Articles molded therefrom evidenced no color loss or fading after subjecting to a carbon arc for a period equivalent to four weeks of sunlight.

EXAMPLE 7

The procedure of Example 6 is substantially duplicated with the exception that instead of hydrated chromium oxide, 40 parts of a liquid dispersion of cobalt blue (obtained by calcination of a mixture of cobalt oxide and aluminum hydroxide) and 200 parts of a 50% solution of NBR (butadiene-acrylonitrile, weight ratio 65:35) in methylstyrene monomer is employed. Articles molded from the devolatilized and extruded products of the mixture have excellent impact resistance and a glossy medium-dark blue color which does not fade nor discolor even after exposure equivalent to four weeks of sunlight.

EXAMPLE 8

The procedure of Example 6 is repeated with the exception that instead of the green hydrated chromium oxide pigment, the stream of colorant comprises 130 parts of a cadmium yellow dispersion (30% pigment, 10% methylstyrene-acrylonitrile copolymer [71:29 ratio] and 60% of methylstyrene polymer) blended as described in Example 2. After devolatilization and extrusion (a step which consumes 3 minutes) in a continuous stream, a medium yellow product is obtained. Articles molded therefrom have excellent color stability and maintain color intensity even after subjecting to synthetic sunlight equivalent to ten weeks exposure.

EXAMPLE 9

The procedure of Example 3 is repeated with the exception that 400 parts of a bronze powder comprising powdered aluminum-copper alloy (150 parts of powder in 250 parts of methylstyrene monomer) is fed to the devolatilizer-extruder with the partially polymerized monomethylstyrene polymer solution. Articles molded therefrom have excellent color uniformity and surface gloss and closely resemble bronze metal in appearance.

It is then seen that the method of the present invention provides a novel and highly useful method for coloring resinous compositions including master color batches, rapidly and economically in a state of uniform color dispersion. The colored plastic mass obtained may be molded, extruded or processed in any of a variety of ways known by those skilled in the art of thermoplastic materials of this type.

We claim:

1. A continuous process for dispersing a colorant into a polymeric material, prepared by polymerizing a compound selected from the group consisting of vinyl aromatic monomers having the formula:

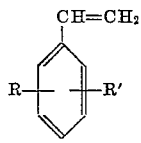

wherein R and R' are substituents selected from the group consisting of hydrogen and alkyl groups containing from 1 to 4 carbon atoms, which comprises continuously blending (1) said colorant dispersed in an inert liquid medium and (2) said polymeric composition dispersed in a liquid medium, comprising the same polymerizable monomer from which said polymeric composition is produced, and simultaneously compounding and devolatilizing the blended materials continuously so as to remove substantially all volatiles including said inert liquid medium and said polymerizable monomer from the blended composition and continuously extruding the colored polymeric composition from the compounding and devolatilizing zone wherein said compounding and devolatilizing is accomplished at a temperature of between about 110° C. and 245° C. at an absolute pressure of less than 200 mm., wherein said polymeric material dispersed in said polymerizable monomer liquid medium does not exceed 75% by weight of the total weight of polymeric material and polymerizable monomer and wherein the time interval from the beginning of the blending step to the completion of the extrusion step does not exceed 10 minutes.

2. A continuous process for dispersing colorant into polymethylstyrene which comprises continuously blending (1) said colorant dispersed in an inert liquid medium and (2) said polymethylstyrene dispersed in monomeric methylstyrene and simultaneously compounding and devolatilizing the blended materials continuously so as to remove substantially all volatiles including said inert liquid medium and said monomeric methylstyrene from the blended composition and continuously extruding the colored polymethylstyrene from the compounding and devolatilizing zone wherein said compounding and devolatilizing is accomplished at a temperature of between about 110° C. and 245° C. at an absolute pressure of less than 200 mm., wherein said polymethylstyrene dispersed in said monomeric methylstyrene does not exceed 75% by weight of the total weight of said polymethylstyrene and monomeric methylstyrene and wherein the time interval from the beginning of the blending step to the completion of the extrusion step does not exceed 10 minutes.

3. A continuous process for dispersing colorant into polystyrene which comprises continuously blending (1) said colorant dispersed in an inert liquid medium and (2) said polystyrene dispersed in monomeric styrene and simultaneously compounding and devolatilizing the blended materials continuously so as to remove substantially all volatiles including said inert liquid medium and said monomeric styrene from the blended composition and continuously extruding the colored styrene from the compounding and devolatilizing zone wherein said compounding and devolatilizing is accomplished at a temperature of between about 110° C. and 245° C. at an absolute pressure of less than 200 mm., wherein said polystyrene dispersed in said monomeric styrene does not exceed 75% by weight of the total weight of said polystyrene and monomeric styrene and wherein the time interval from the beginning of the blending step to the completion of the extrusion step does not exceed 10 minutes.

4. A continuous process for dispersing pigment into polymethylstyrene which comprises continuously blending (1) said pigment dispersed in an inert liquid medium and (2) said polymethylstyrene dispersed in monomeric methylstyrene and simultaneously compounding and devolatilizing the blended materials continuously so as to remove substantially all volatiles including said inert liquid medium and said monomeric methylstyrene from the blended composition and continuously extruding the pigmented polymethylstyrene from the compounding and devolatilizing zone wherein said compounding and devolatilizing is accomplished at a temperature of between about 110° C. and 245° C. at an absolute pressure of less than 200 mm., wherein said polymethylstyrene dispersed in said monomeric methylstyrene does not exceed 75% by weight of the total weight of said polymethylstyrene and monomeric methylstyrene and wherein the time interval from the beginning of the blending step to the completion of the extrusion step does not exceed 10 minutes.

5. A continuous process for dispersing pigment into polystyrene which comprises continuously blending (1) said pigment dispersed in an inert liquid medium and (2) said polystyrene dispersed in monomeric styrene and simultaneously compounding and devolatilizing the blended materials continuously so as to remove substantially all volatiles including said inert liquid medium and said monomeric styrene from the blended composition and continuously extruding the pigmented styrene from the compounding and devolatilizing zone wherein said compounding and devolatilizing is accomplished at a temperature of between about 110° C. and 245° C. at an absolute pressure of less than 200 mm., wherein said polystyrene dispersed in said monomeric styrene does not exceed 75% by weight of the total weight of said polystyrene and monomeric styrene and wherein the time interval from the beginning of the blending step to the completion of the extrusion step does not exceed 10 minutes.

6. A continuous process for dispersing pigment into a copolymer of methylstyrene and acrylonitrile which comprises continuously blending (1) said pigment dispersed in an inert liquid medium and (2) said copolymer of methylstyrene and acrylonitrile dispersed in a mixture of monomeric methylstyrene and monomeric acrylonitrile and simultaneously compounding and devolatilizing the blended materials continuously so as to remove substantially all volatiles including said inert liquid medium and said mixture of monomeric methylstyrene and monomeric acrylonitrile from the blended composition and continuously extruding the pigmented copolymer of methylstyrene and acrylonitrile from the compounding and devolatilizing zone wherein said compounding and devolatilizing is accomplished at a temperature of between about 110° C. and 245° C. at an absolute pressure of less than 200 mm., wherein said copolymer of methylstyrene and acrylonitrile dispersed in said mixture of monomeric methylstyrene and monomeric acrylonitrile does not exceed 75% by weight of the total weight of said copolymer of methylstyrene and acrylonitrile and mixture of monomeric methylstyrene and monomeric acrylonitrile and wherein the time interval from the beginning of the blending step to the completion of the extrusion step does not exceed 10 minutes.

References Cited in the file of this patent

UNITED STATES PATENTS

| | | |
|---|---|---|
| 2,433,849 | Lathrop | Jan. 6, 1948 |
| 2,480,821 | Connell | Sept. 6, 1949 |
| 2,520,429 | Park et al. | Aug. 29, 1950 |

FOREIGN PATENTS

| | | |
|---|---|---|
| 662,020 | Great Britain | Nov. 28, 1951 |
| 708,124 | Great Britain | Apr. 28, 1954 |